2,744,105

AZONITRILES CONTAINING QUATERNARY AMMONIUM SALT GROUPS

Arthur L. Barney, Wilmington, Del., assignor to E. I. du Pont de Nemours and Company, Wilmington, Del., a corporation of Delaware No Drawing. Application May 10, 1952, Serial No. 287,255

7 Claims. (Cl. 260—192)

This invention relates to new aliphatic azonitriles containing quaternary ammonium groups, and to their preparation.

It is known that certain azo compounds are extremely valuable initiators for the polymerization of polymerizable compounds containing ethylenic unsaturation (see, for example, U. S. Patent 2,471,959 to Madison Hunt). It is highly desirable that polymerization initiators be soluble in water, since large scale polymerizations are desirably conducted in aqueous systems. However, water-soluble azo initiators are in general not readily available.

This invention has as an object the preparation of new azo compounds. A further object is the preparation of new intermediates. Another object is the preparation of new polymerization initiators. A still further object is the preparation of polymers and especially of new polymers. Other objects will appear hereinafter.

These objects are accomplished by the present invention of azo compounds wherein the azo group is acyclic and has each of its valences attached to tertiary carbon, in turn attached to (a) a cyano group, (b) an alkyl radical of one to four carbon atoms, and (c) a saturated divalent hydrocarbon radical of one to six carbon atoms, said radical having its other valence attached to a quaternary ammonium salt group.

More specifically, the compounds of this invention are quaternary ammonium salts with esters of monobasic acids having an ionization constant greater than about $1.6 \times 10^{-5}$, of azonitriles in which the azo group is acyclic and has each of its valences attached to tertiary carbon, in turn attached to (a) a cyano group, (b) an alkyl radical of one to four carbons, and (c) a saturated divalent hydrocarbon radical of one to six carbons, said radical having its other valence attached to a tertiary amino nitrogen atom, the remaining valences of which are attached to alkyl radicals or to a radical which, together with the tertiary amino nitrogen, forms a heterocyclic ring.

The new compounds of this invention are represented broadly by the general formula:

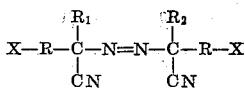

where X is a quaternary ammonium salt group, R is a saturated divalent hydrocarbon radical of one to six carbon atoms, and $R_1$ and $R_2$ are alkyl groups of one to four carbon atoms.

More specifically, the compounds of this invention are represented by the formula:

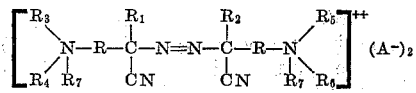

where R is a saturated divalent hydrocarbon radical, and preferably a polymethylene radical, of one to six carbon atoms, $R_1$ and $R_2$ are alkyl groups of one to four carbon atoms, $R_3$, $R_4$, $R_5$, and $R_6$ are alkyl radicals of one to four carbon atoms or radicals which form with each amino nitrogen a heterocyclic ring of five to six atoms, $R_7$ is a hydrocarbon radical of one to eighteen carbon atoms and A is the anion of an organic or inorganic monobasic acid of ionization constant greater than $1.6 \times 10^{-5}$, $R_7$ and A being radicals which when together form an ester.

Suitable starting materials for the preparation of the quaternary ammonium compounds of this invention are the azonitriles containing tertiary amino groups, for example, those disclosed and claimed in application Ser. No. 95,572, filed by J. R. Johnson on May 26, 1949 (now U. S. Patent 2,605,260). These azonitriles containing tertiary amino groups are converted to quaternary ammonium compounds by treatment with an appropriate quaternizing agent, e. g., an alkyl halide, aralkyl halide, dialkyl sulfate, arylalkyl sulfate, alkylaryl sulfonate, and the like.

These compounds when used as initiators in addition polymerization contribute to the polymer end groups which are monovalent radicals having the free valence extending from a tertiary carbon in turn joined to (a) a cyano group, (b) an alkyl group of one to four carbons, and (c) a divalent saturated hydrocarbon radical of one to six carbons preferably a polymethylene radical which has its other valence bonded to a quaternary salt group. Thus addition polymers containing quaternary ammonium groups can be prepared directly and in one step from vinylidene monomers, without having to use polymerizable ingredients containing quaternary ammonium groups. Moreover, and particularly in the case of polyacrylonitrile, these polymers possess dye receptivity comparable to that of copolymers containing a much higher amount of dye-receptive structures.

The polymers of this invention are high molecular weight, linear addition polymers which contain quaternary ammonium salt groups at the ends of the linear polymeric chain. The invention also includes a process of preparing these polymers which comprises polymerizing a vinylidene monomer with the aid of the polymerization initiators of the present invention containing quaternary ammonium salt groups.

This discovery is based on the principle that, in free radical-induced addition polymerization, fragments of the initiator attach themselves to at least one end of the polymer molecule. This principle is discussed by Marvel and Horning in Chapter 8, "Synthetic Polymers," pp. 701–778, and particularly at page 775, of Gilman's "Organic Chemistry—An Advanced Treatise" (1943). Other excellent discussions are found in Chapter III of "Chemistry of Plastics and High Polymers" by P. D. Ritchie (1949), particularly at pages 29 and 35, and at page 76 of Price, "Reactions at Carbon—Carbon Double Bonds" (1946). The former discusses the experimental evidence that initiator fragments are attached to one or both ends of the polymer molecule. Still more recently Arnett and Peterson, in a paper entitled "Vinyl Polymerization with a Radioactive Aliphatic Azodinitrile Initiator" (Abstracts of Papers, 119th Meeting American Chemical Society, April 1951, page 15J) have shown that, in the polymerization of methyl methacrylate with azonitrile initiators, an initiator fragment attaches itself to each end of the polymer molecule.

According to this invention, vinylidene monomers are polymerized in the presence of free radical-producing initiators containing quaternary ammonium groups. The resulting polymers have, attached to the ends of the linear polymer molecule, initiator fragments containing these quaternary ammonium groups. The products so obtained are high molecular weight polymers, e. g., they have molecular weights above 10,000 and generally in the range of 25,000 to 250,000. Consequently, the weight ratio of the quaternary ammonium groups to the polymer is very low. These polymers contain normally less than 0.25%, and in general less than 0.1%, of added nitrogen due to the quaternary ammonium groups. Nevertheless, this low amount of quaternary ammonium groups is capable of producing remarkable effects, such as greatly increased dye receptivity, particularly in the case of polyacrylonitrile.

Azonitriles function as polymerization initiators by virtue of their decomposition with evolution of nitrogen and transitory formation of free radicals which initiate the polymerization reaction. These are the fragments which attach themselves to the ends of the polymer molecule. Thus, the polymers of this invention have their linear chains terminated by quaternized (alpha-alkyl-alpha - cyano - omega - dialkylamino)alkyl groups, which groups may be represented by the formula

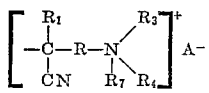

where the R's and A have the significancce previously indicated.

The following examples in which parts are by weight are illustrative of the invention.

EXAMPLE I

*Quaternary ammonium salt of alpha,alpha'-azobis-(alpha-methyl-gamma-diethylaminobutyronitrile) with methyl p-toluenesulfonate*

Methyl beta-diethylaminoethyl ketone was prepared as described by Wilds and Shunk in J. Am. Chem. Soc. 65, 471 (1943). The fraction boiling at 72–73° C. at 13 mm. pressure and having a refractive index $n_D^{25}$ 1.4328 was employed for conversion to the azonitrile.

A mixture of 25 parts of methyl beta-diethyl-aminoethyl ketone and 4 parts of hydrazine hydrate was maintained at 25–50° C. for 16 hours, and after cooling to 0° C., treated with 6.2 parts of hydrogen chloride in 20 parts of water to adjust the pH to about 6. The solution so obtained was mixed with 42 parts of hydrogen cyanide. After 15 hours' standing at room temperature, the excess hydrogen cyanide was removed by evaporation, 100 parts of water was added and the solution was cooled to 5–10° C. Chlorine was passed into the solution until free halogen was present. The solution was then neutralized with an excess of 40% aqueous sodium hydroxide solution and the oil which separated was extracted with ether. Evaporation of the ether gave 17 parts of liquid alpha,alpha' - azobis(alpha-methyl - gamma-diethylaminobutyronitrile), having the formula:

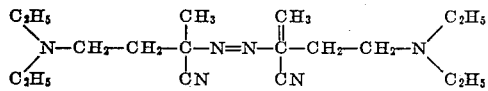

This compound had a neutralization equivalent of 170, as compared with the calculated equivalent of 167.

A solution of 15 parts of the above azonitrile and 25 parts of methyl p-toluenesulfonate in 14 parts of methanol was allowed to stand 16 hours at room temperature. It was then treated with 700 parts of diethyl ether, which caused the separation of a light yellow oil, which stiffened on standing and further washing with ether. This material (20 parts) could not be induced to crystallize, presumably because it was a mixture of stereoisomers. The product so obtained was the methyl p-toluenesulfonate quaternary ammonium salt of alpha,alpha'-azobis (alpha-methyl-gamma-diethylaminobutyronitrile), having the formula:

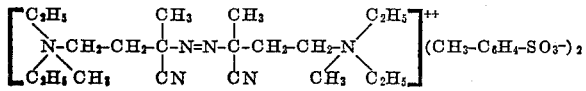

The above material was instantly and completely soluble in water. Without any purification, it was an excellent initiator for polymerization. See Examples III, V, and VI.

EXAMPLE II

*Quaternary ammonium salt of alpha,alpha'-azobis-(alpha-methyl-gamma-dimethylaminobutyronitrile) with dimethyl sulfate*

Methyl beta-dimethylaminoethyl ketone was prepared in a manner similar to that described in Example I for the diethyl analog. The fraction boiling at 47° C. at 10 mm. pressure and having a refractive index $n_D^{25}$ of 1.4219, was used to prepare the azonitrile.

The ketone was converted to the corresponding hydrazinonitrile by successive reaction with hydrazine and hydrogen cyanide according to the procedure of Example I. The hydrazinonitrile was isolated in high yield as a very light yellow oil. Attempts to induce the material to crystallize were unsuccessful, presumably because it was a mixture of stereoisomers. The hydrazinonitrile was oxidized by means of gaseous chlorine as in Example I. During the course of the oxidation, fine white crystals separated from solution. The oxidation mixture was kept at 0–5° C. for 16 hours and then filtered. The crystalline solid and the solution were separately made strongly alkaline with aqueous potassium hydroxide, while the temperature was maintained below 20° C., and both solutions were extracted with diethyl ether. The separate ether solutions were dried over sodium carbonate, filtered and the solvent was removed under reduced pressure. There was obtained a light yellow oil from the soluble amino azonitrile hydrochloride.

Both amino azonitrile samples were separately treated at room temperature in acetone solution with dimethyl sulfate, using in each case a weight of dimethyl sulfate equal to the weight of the amino azonitrile. Reaction was evidenced by the immediate formation of an insoluble phase, crystalline in one case and oily in the other. After 24 hours at room temperature, the solvent was separated from the quaternary salts in both reaction mixtures, and the quaternary salts were washed with ether. The crystalline quaternary salt, which was not markedly hygroscopic, melted at 132–133° C. with decomposition.

The product so obtained was the methosulfate quaternary ammonium salt of alpha,alpha'-azobis(alpha-methyl-gamma-dimethylaminobutyronitrile), having the formula:

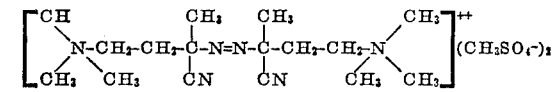

It contained by analysis 15.25% of nitrogen and 11.94% of sulfur, as compared with the calculated amounts of 15.85% of nitrogen and 12.07% of sulfur. The oily quaternary salt partly solidified on standing. It was presumably a mixture of stereoisomers.

Both samples were rapid and efficient polymerization initiators as shown in Example IV.

EXAMPLE III

A solution of 10 parts of acrylonitrile in 50 parts of water was mixed with 5 parts of a 2% aqueous solution of the methyl p-toluenesulfonate quaternary salt of alpha-alpha'-azobis(alpha-methyl - gamma-diethylaminobutyronitrile), and the reaction mixture was heated at 80–90° C. for three hours under nitrogen atmosphere. The polymer which precipitated was filtered, washed with methanol and dried. It was of high molecular weight, as shown by its inherent viscosity of 1.33 at 0.1% concentration in dimethylformamide at 25° C. Films cast from a 10% solution of this polyacrylonitrile in dimethylformamide showed very rapid absorption of a blue acid dye of the anthraquinone type when the film was immersed during 20 minutes in a boiling aqueous solution (pH 6.0)

of the dye. The dye was fast to boiling in a 0.5% soap solution or in a 1% aqueous solution of technical sodium dodecylsulfate.

Another polymerization of acrylonitrile (10 parts in 100 parts of water) with 2 parts of a 2% aqueous solution of the same initiator but otherwise under the same conditions gave a polyacrylonitrile of still higher molecular weight, having an intrinsic viscosity of 2.35 in 0.2% dimethylformamide at 25° C. In spite of the fact that this polymer could have contained only very low amounts of quaternary ammonium groups, it still showed appreciable dye receptivity by the test described above.

In comparison with the above results, a polyacrylonitrile prepared with the aid, as the initiator, of an azonitrile not containing quaternary ammonium groups, showed no dye receptivity under the same conditions, even at a relatively low molecular weight.

EXAMPLE IV (a) A solution of 10 parts of acrylonitrile in 100 parts of water was treated with 10 parts of a 2% aqueous solution of the quaternary ammonium salt of alpha,alpha'-azobis(alpha-methyl-gamma-dimethylaminobutyronitrile) with dimethyl sulfate, as initiator. The mixture was adjusted to a pH of 4.0 with sulfuric acid, then heated at 80–90° C. in an atmosphere of nitrogen for 2½ hours. There was obtained 8 parts of polyacrylonitrile having an inherent viscosity of 1.88 at 0.2% concentration in dimethylformamide at 25° C.

(b) Same as (a) except that there was used only 5 parts of the 2% aqueous solution of initiator. There was obtained 3 parts of polyacrylonitrile having an inherent viscosity, measured as above, of 2.56.

(c) Same as (a) except that there was used 2 parts of the 2% aqueous solution of initiator. There was obtained 4 parts of polyacrylonitrile having an inherent viscosity, measured as above, of 4.31.

Films were cast from dimethylformamide solutions of the above polymers. After thorough washing with water, these films were immersed for periods of 10–20 minutes in a boiling aqueous dye bath containing 0.1% of a blue acid dye of the anthraquinone type, the dye bath being adjusted to a pH of 6.0. In all cases the films absorbed the dye and retained it after exposure to boiling 0.5% soap solutions or 1% sodium dodecylsulfate solutions. The dye receptivity of these polymers was comparable to that of an acrylonitrile copolymer containing about 5% by weight of a comonomer with dye-receptive sites, in this case an acrylonitrile/vinylpyridine copolymer of the type described in U. S. 2,491,471.

EXAMPLE V

The following polymerization mixture was prepared: 10 parts of styrene, 50 parts of distilled water, 0.5 part of technical sodium dodecylsulfate, and 5 parts of a 2% aqueous solution of the quaternary ammonium salt of alpha,alpha' - azobis(alpha - methyl - gamma - diethylaminobutyronitrile) with methyl p-toluenesulfonate. This mixture was stirred and heated to reflux (about 100° C.) under nitrogen for 4 hours. The smooth polymer dispersion which had formed was broken by addition of methanol. The precipitated polystyrene was filtered, washed thoroughly with methanol and dried. There was obtained 8.5 parts of polystyrene having an inherent viscosity of 2.05 at 0.2% concentration in benzene at 25° C.

EXAMPLE VI

The polymerization procedure of Example V was repeated using 10 parts of methyl methacrylate as the polymerizable monomer. There was obtained 8.05 parts of polymethyl methacrylate having an inherent viscosity of 4.56 at 0.2% concentration in chloroform at 25° C.

This invention is generic in its initiator aspect to quaternary ammonium salts having an acyclic azo, —N=N—, group which has each of its valences attached to discrete tertiary carbon atoms, in turn attached to a cyano group, an alkyl radical of one to four carbon atoms, and a saturated divalent hydrocarbon radical of one to six carbon atoms, said radical having its other valence attached to a quaternary ammonium nitrogen atom. In such compounds the quaternary ammonium group can be attached to any carbon which is removed from the azo group by at least one carbon atom. Preferably, the radicals attached to the quaternary ammonium nitrogen atoms are alkyl groups of one to four carbons, or a divalent hydrocarbon group of four to five carbons, which together with the amino nitrogen forms a heterocyclic ring of five to six atoms. The preferred compounds are those in which the radicals attached to the quaternary ammonium nitrogen atom are alkyl groups of one to two carbons, the saturated divalent hydrocarbon radical is a methylene chain of one to three methylene groups, and the radicals attached to the tertiary carbon atom are alkyl groups of one to two carbons.

The quaternary ammonium compounds of the present invention can be made by reacting a quaternizing agent, as set forth below, with an azo compound wherein the acyclic azo, —N=N—, group has each of its valences attached to discrete tertiary carbon atoms which are each in turn attached to (a) a cyano group, (b) an alkyl radical of one to four carbon atoms, and (c) a divalent saturated aliphatic hydrocarbon radical of one to six carbon atoms in turn attached to a tertiary amino nitrogen. The remaining valences of the tertiary amino nitrogen are preferably satisfied by alkyl groups of one to four carbons or a divalent hydrocarbon group of four to five carbons between the free valences which together with the tertiary amino nitrogen forms a heterocyclic ring of five to six atoms. The preferred azo tertiary amines are those in which the tertiary amino nitrogen is attached to two alkyl radicals of one to two carbons and to a methylene chain of one to three methylene groups in turn attached to the discrete tertiary carbon bonded to the azo group.

Specific azonitriles containing tertiary amino groups suitable for use in this invention, in addition to those of the examples, include alpha,alpha'-azobis(alpha-methyl-delta-diethylaminovaleronitrile), alpha,alpha' - azobis(alpha-butyl - gamma - dimethylaminobutyronitrile), alpha,-alpha'-azobis(alpha-methyl - gamma-dibutylaminobutyronitrile), alpha,alpha'-azobis(alpha-methyl-omega-dimethylaminocaprylonitrile), alpha,alpha' - azobis(alpha-methyl-beta-dimethylaminopropionitrile), alpha,alpha'-azobis-(alpha-methyl-delta-piperidinovaleronitrile), etc.

These tertiary amines can be converted to the quaternary ammonium salts of the presents invention by treatment with any quaternizing agent, i. e., any of those esters known to quaternize tertiary amines. Preferably, the quaternizing agent is an ester of a monobasic organic or inorganic acid of ionization constant of at least $1.6 \times 10^{-5}$ with an alcohol of one to eighteen carbon atoms which, apart from the hydroxyl group, contains only carbon and hydrogen. Still more preferably, it is an ester of an alkanol of one to four carbon atoms with a halogen acid where the halogen has an atomic number of 17 to 53, inclusive, sulfuric acid or a hydrocarbon sulfonic acid where the hydrocarbon portion has one to seven carbon atoms. Suitable quaternizing agents include alkyl halides, aralkyl halides, dialkyl sulfates, aralkyl sulfates, aralkyl sulfonates, alkylalkyl sufonates or alkyl phosphates, including, among others, methyl chloride, methyl iodide, ethyl bromide, ethyl iodide, benzyl chloride, phenylethyl bromide, allyl chloride, dodecyl iodide, octadecyl bromide, oleyl bromide, cyclohexyl bromide, diethylsulfate, phenyl methyl sulfate, methyl ethanesulfonate, methyl benzenesulfonate, ethyl p-toluenesulfonate, butyl xylenesulfonate, methyl cyclohexanesulfonate, methyl formate, octyl acetate, methyl chloroacetate, triethyl phosphate, etc.

The quaternary ammonium compounds are prepared simply by bringing the tertiary amino azonitrile in contact with the quaternizing agent and allowing the reaction to proceed. Preferably, there is used an excess of quaternizing agent, e. g., a 10–100% excess, relative to the tertiary amino azonitrile. There should be used enough quaternizing agent to react with both of the tertiary amino nitrogens in the azonitrile. The use of a solvent is not essential but it is preferable. Any organic solvent which is inert to the reactants under the operating conditions can be used. Examples of suitable solvents are the aliphatic alcohols such as methanol, ethanol, propanol, butanol, tertiary butyl alcohol, cyclohexanol, and the like. Other suitable solvents are the aliphatic ketones such as acetone, diethyl ketone, dibutyl ketone, cyclohexanone, and the like. The reaction temperature can be as high as the decomposition point of the azo compound, preferably in the range between 0–100° C. and still more preferably in the range between about 15 and about 50° C. In general, the reaction is substantially complete within a few hours at this temperature. In some cases, depending upon the solvent, the quaternary ammonium salt precipitates out of the reaction mixture. If it is soluble, it can be isolated by treating the reaction mixture with a nonsolvent such as diethyl ether or an aliphatic hydrocarbon. In general, no purification of the products is needed beyond a washing with a suitable nonsolvent to remove the unreacted materials. The quaternary ammonium salts are mixtures of stereoisomers so that, in general, they are uncrystallizable materials, oily or pasty in consistency. Under certain circumstances, for example, when the reaction solvent is especially favorable to the separation of the stereoisomers, a portion at least of the quaternary ammonium compounds may be obtained as a crystalline solid. However, the isomeric mixtures which are normally obtained are entirely satisfactory for all uses of these compounds.

By the methods above outlined there can be prepared, among others, the following illustrative compounds of the present invention: the quaternary ammonium salts of alpha,alpha'- azobis(alpha- methyl- gamma- diethylaminobutyronitrile) with methyl chloride, octadecyl bromide or triethyl phosphate; the quaternary ammonium salts of alpha,alpha'-azobis(alpha-methyl-gamma- dimethylaminobutyronitrile) with ethyl iodide, benzyl chloride, cyclohexyl bromide or butyl xylenesulfonate; the quaternary ammonium salts of alpha,alpha'-azobis(alpha-methyl-delta-diethylaminovaleronitrile) with methyl iodide, allyl chloride or diethyl sulfate; the quaternary ammonium salts of alpha,alpha'-azobis(alpha-methyl-omega-dimethylamino-caprylonitrile) with dimethyl sulfate, methyl chloroacetate or methyl cyclohexanesulfonate; the quaternary ammonium salts of alpha,alpha'-azobis(alpha-methyl-beta-dimethylaminopropionitrile) with methyl p-toluenesulfonate, methyl formate or phenylethyl bromide; the quaternary ammonium salts of alpha,alpha'-azobis-(alpha-methyl-delta-piperidinovaleronitrile) with dodecyl iodide, oleyl bromide or methyl ethanesulfonate; and the like.

As already mentioned, the quaternary ammonium salts of this invention are water-soluble and they are especially adapted for use as initiators in aqueous polymerization systems. They are also useful as catalysts for chain reactions, e. g., chlorination, chlorosulfonation, or addition to unsaturates. Moreover, they are useful in the preparation of other derivatives such as the esters and amides, which are readily obtained from the nitriles by formation of the corresponding ether hydrochloride by reaction with an alcohol and hydrogen chloride, followed by treatment with water or ammonia or a secondary amine. These esters and amides are also useful as polymerization initiators.

The initiators of this invention are of generic application in the addition polymerization of polymerizable compounds having the non-aromatic $>C=C<$ group. It is thus applicable to the addition polymerization of vinylidene compounds, including vinyl compounds. Furthermore, it is applicable to the addition polymerization of compounds having a plurality of ethylenic linkages of aliphatic character, whether conjugated or isolated. A particularly preferred class is that of polymerizable unsaturated compounds wherein the carbon-to-carbon unsaturation consists in a terminal methylene, $CH_2$, joined by an ethylenic double bond to its neighboring carbon, i. e., consists in a $CH_2=C<$ group.

Compounds which are subject to polymerization and copolymerization by the process of this invention include those having one ethylenic unsaturation such as olefins, e. g., ethylene, propylene, isobutylene; acrylyl and alkacrylyl compounds, e. g., acrylic, haloacrylic and methacrylic acids, esters, nitriles and amides, for example, acrylonitrile, methacrylonitrile, methyl methacrylate, butyl methacrylate, cyclohexyl methacrylate, ethyl acrylate, methoxymethyl methacrylate, beta-diethylaminoethyl methacrylate, chloroethyl methacrylate, alpha-chloroacrylic acid, methacrylic acid; vinyl and vinylidene halides, e. g., vinyl fluoride, vinyl chloride, vinylidene chloride; vinyl carboxylates, e. g., vinyl acetate, vinyl formate, vinyl laurate; N-vinyl imides, e. g., N-vinylphthalimide and N-vinylsuccinimide; vinyl aryls, e. g., styrene and vinylnaphthalene; and other vinyl derivatives such as methyl vinyl ketone, vinylpyridine and vinyl ethyl ether.

Polyfluoroethylenes of the general formula $CF_2=CXY$ wherein X is hydrogen, chlorine or fluorine and Y is chlorine or fluorine, that may be polymerized alone or copolymerized with ethylene or other monomers, include tetrafluoroethylene, chlorotrifluoroethylene, trifluoroethylene and 1,1-dichloro-2,2-difluoroethylene.

Polymerizable compounds having a plurality of ethylenic double bonds that may be polymerized or copolymerized by the process of this invention include 1,3-butadiene, 2-chlorobutadiene, 2-fluorobutadiene, isoprene, diethylene glycol dimethacrylate, glyceryl triacrylate, diallyl maleate, allyl methacrylate, diallyl phthalate, diallyl adipate, divinyl succinate, divinylbenzene, etc.

Two or more monomers may be polymerized together to give copolymers containing quaternary ammonium groups. Also, compounds such as maleic anhydride and dialkyl esters of fumaric and maleic acid may be copolymerized with, for example, ethylene, vinyl chloride or styrene.

The initiators of this invention are of particular value in the preparation of polymers intended for use in film and fiber applications where the polymers as heretofore prepared are not satisfactory from the standpoint of dyeability. Such polymers include acrylonitrile homopolymer which when prepared by the methods of this invention, and therefore having end groups of fragments of the azo quaternary salts of this invention, differ from previous acrylonitrile homopolymers not only in the end groups but also in their susceptibility to dyeing.

The polymerization conditions are those customarily used in addition polymerizations with free radical producing initiators. Thus, the polymerizations may be carried out by the bulk, solution, emulsion or granular techniques. The initiators of this invention containing quaternary ammonium groups are soluble in water, and therefore particularly well adapted for use in aqueous polymerization systems.

The optimum polymerization conditions will, of course, vary depending on the monomer used. Thus, gases such as ethylene and propylene normally require pressure, whereas pressure is not essential with high boiling monomers. The polymerizations are usually carried out in the temperature range of 25 to 150° C., but higher temperatures such as 200° C. may be found useful, particularly when the reaction time is to be kept at a minimum, e. g., in a continuous process. Light of wavelengths of 3100–4500 Angstrom units increases the rate of polymerization and with the use of such light polymerization may be effected at temperatures of 25 to −20° C. or even lower.

The amount of initiator employed is subject to wide variation. Very small amounts, e. g., 0.005% by weight of the monomer, can be used but in general it is preferred to use amounts between 0.1% and 5% by weight of the monomer, in order to confer more significant modification to the resulting polymer.

The products of this invention are linear, or substantially linear, addition polymers having molecular weights in excess of 10,000 and containing quaternary ammonium groups at the ends of the polymeric chain, in initiator fragments consisting of a monovalent radical with its free valence stemming from a tertiary carbon in turn attached to (a) a cyano group, (b) an alkyl radical of one to four carbons, (c) a divalent saturated aliphatic hydrocarbon radical of one to six carbons, preferably a polymethylene radical, in turn attached to a quaternary ammonium salt group preferably hydrocarbon but for the nitrogen and the anion, said anion being that of a monobasic acid of ionization constant at least $1.6 \times 10^{-5}$.

In appearance, these polymers are not markedly different from conventional addition polymers not containing quaternary ammonium end groups. Thus, for example, they are not different from conventional polymers in molding and film-casting behavior. The amount of nitrogen introduced in the polymers through the quaternary ammonium groups is very small. In general, it is less than 0.25% and, with polymers in the usual molecular weight range of 25,000 to 250,000, it is less than 0.1% and may be as low as 0.005%. Thus, the nitrogen due to the quaternary ammonium groups is normally not determinable quantitatively, particularly when the polymer already contains nitrogen as is the case, for example, with polyacrylonitrile, but as already noted, the polymers of this invention are technically useful because of their ability to absorb and retain acid dyes. They are also useful as ingredients of antistatic coating compositions.

The term polymer as used herein denotes a high polymer—one whose molecule is a macromolecule in the I. U. P. A. C. sense (J. Polymer Sci. 8, 252–77, March 1952) and a homopolymer is one whose repeating unit, disregarding the end groups, is essentially the same.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A quaternary ammonium salt having an acyclic azo, —N=N—, group whose valences are attached to discrete tertiary carbon atoms each of which is attached to (a) a cyano group, (b) an alkyl radical of one to four carbon atoms, (c) a saturated divalent aliphatic hydrocarbon radical of one to six carbon atoms which radical is directly attached to the nitrogen of a quaternary ammonium salt group.

2. A quaternary ammonium salt having an acyclic azo, —N=N—, group whose valences are attached to discrete tertiary carbon atoms each of which is attached to (a) a cyano group, (b) an alkyl radical of one to four carbon atoms, (c) a saturated divalent aliphatic hydrocarbon radical of one to six carbon atoms which radical is directly attached to the nitrogen of a quaternary ammonium salt group the remaining valences of the quaternary ammonium nitrogen in the cation of said salt group being attached only to hydrocarbon radicals.

3. A quaternary ammonium salt having an acyclic azo, —N=N—, group whose valences are attached to discrete tertiary carbon atoms each of which is attached to (a) a cyano group, (b) an alkyl radical of one to four carbon atoms, (c) a saturated divalent aliphatic hydrocarbon radical of one to six carbon atoms which radical is directly attached to the nitrogen of a quaternary ammonium salt group the cation of which salt group contains only nitrogen and alkyl groups.

4. A quaternary ammonium salt having an acyclic azo, —N=N—, group whose valences are attached to discrete tertiary carbon atoms each of which is attached to (a) a cyano group, (b) an alkyl radical of one to four carbon atoms, (c) a saturated divalent aliphatic hydrocarbon radical of one to six carbon atoms which radical is directly attached to the nitrogen of a quaternary ammonium salt group, the remaining valences of the nitrogen in the cation of said salt group being attached to saturated hydrocarbon radicals.

5. A quaternary ammonium salt having an acyclic azo, —N=N—, group whose valences are attached to discrete tertiary carbon atoms each of which is attached to (a) a cyano group, (b) an alkyl group of one to four carbons, (c) a polymethylene chain of one to six carbon atoms which radical is directly attached to the nitrogen of a quaternary ammonium salt group having, attached to the quaternary nitrogen, (a) three alkyl groups of up to four carbons each, (b) the anion of an acid of ionization constant of at least $1.6 \times 10^{-5}$.

6. Alpha,alpha' - azobis(alpha - methyl-gamma-methyldiethylammonium butyronitrile p-toluenesulfonate).

7. Alpha,alpha' - azobis(alpha - methyl - gamma - trimethylammonium butyronitrile methylsulfate).

References Cited in the file of this patent

UNITED STATES PATENTS

| | | |
|---|---|---|
| 2,471,959 | Hunt | May 31, 1949 |
| 2,492,763 | Pinkney | Dec. 27, 1949 |
| 2,515,628 | Castle | July 18, 1950 |
| 2,520,338 | Robertson | Aug. 29, 1950 |
| 2,556,876 | Hill | June 12, 1951 |
| 2,565,573 | Pease et al. | Aug. 28, 1951 |
| 2,566,821 | Brown et al. | Sept. 4, 1951 |
| 2,584,992 | Dykstra | Feb. 12, 1952 |
| 2,599,299 | Upson | June 3, 1952 |
| 2,599,300 | Upson | June 3, 1952 |
| 2,605,260 | Johnson | July 29, 1952 |
| 2,608,554 | Bullitt | Aug. 26, 1952 |